United States Patent
Albean

(10) Patent No.: US 7,212,247 B2
(45) Date of Patent: May 1, 2007

(54) AUDIO/VIDEO SYSTEM PROVIDING VARIABLE DELAY

(75) Inventor: David Lawrence Albean, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 590 days.

(21) Appl. No.: 10/348,626

(22) Filed: Jan. 22, 2003

(65) Prior Publication Data

US 2003/0142232 A1 Jul. 31, 2003

Related U.S. Application Data

(60) Provisional application No. 60/354,056, filed on Jan. 31, 2002.

(51) Int. Cl.
*H04N 9/475* (2006.01)
*H04N 5/04* (2006.01)

(52) U.S. Cl. ............ 348/515; 348/512; 348/518; 348/523; 348/423.1; 348/425.4

(58) Field of Classification Search ........ 348/515, 348/512, 518, 500, 523, 738, 423.1, 425.4; 375/240.28, 355; 386/71, 75, 84, 85, 96
See application file for complete search history.

(56) References Cited

U.S. PATENT DOCUMENTS

| 4,018,990 A | * | 4/1977 | Long et al. ............ 348/513 |
| 4,313,135 A | * | 1/1982 | Cooper ................. 348/512 |
| 4,703,355 A |   | 10/1987 | Cooper ................ 358/149 |
| 5,351,090 A | * | 9/1994 | Nakamura ............. 348/484 |
| 5,387,943 A |   | 2/1995 | Silver .................. 348/512 |
| 5,570,372 A | * | 10/1996 | Shaffer ................ 370/468 |
| 5,598,352 A |   | 1/1997 | Rosenau et al. ....... 364/514 |
| 5,642,171 A |   | 6/1997 | Baumgartner et al. .. 348/515 |
| 5,808,722 A | * | 9/1998 | Suzuki ................. 352/12 |
| 5,815,634 A |   | 9/1998 | Daum et al. ........... 386/96 |
| 5,874,997 A |   | 2/1999 | Haigh ................. 348/423 |
| 5,889,563 A |   | 3/1999 | Bramley ............... 348/515 |

(Continued)

FOREIGN PATENT DOCUMENTS

EP 0577216 A1 1/1994

(Continued)

OTHER PUBLICATIONS

European Search Report of Jul. 31, 2003.

*Primary Examiner*—David Ometz
*Assistant Examiner*—Jean W. Désir
(74) *Attorney, Agent, or Firm*—Joseph J. Laks; Robert D. Shedd

(57) ABSTRACT

An audio/video system (100) is capable of introducing variable amounts of delay into a signal path so as to properly synchronize two signals, such as a video signal and a corresponding audio signal. According to an exemplary embodiment, the audio/video system (100) includes first circuitry (50) for applying a first delay to a first digital signal. Second circuitry (80) applies a variable second delay to a second digital signal to time align the second digital signal relative to the first digital signal. The second circuitry (80) includes an addressable memory (84) for selectively storing the second digital signal and for outputting the second digital signal on a first-in, first-out basis to apply the variable second delay to the second digital signal.

19 Claims, 4 Drawing Sheets

U.S. PATENT DOCUMENTS

| | | | |
|---|---|---|---|
| 5,946,049 A * | 8/1999 | Cooper et al. | 348/513 |
| 5,949,410 A | 9/1999 | Fung | 345/302 |
| 6,016,166 A | 1/2000 | Huang et al. | 348/515 |
| 6,078,725 A * | 6/2000 | Tanaka | 386/100 |
| 6,124,895 A | 9/2000 | Fielder | 348/515 |
| 6,181,383 B1 | 1/2001 | Fox et al. | 348/515 |
| 6,262,776 B1 | 7/2001 | Griffits | 348/512 |
| 6,330,033 B1 * | 12/2001 | Cooper | 348/512 |
| 6,380,981 B1 * | 4/2002 | Kasezawa et al. | 348/515 |
| 6,429,902 B1 * | 8/2002 | Har-Chen et al. | 348/518 |
| 6,480,902 B1 * | 11/2002 | Yuang et al. | 709/248 |
| 6,744,473 B2 * | 6/2004 | Wells | 348/515 |
| 6,744,815 B1 * | 6/2004 | Sackstein et al. | 375/240 |
| 7,020,894 B1 * | 3/2006 | Godwin et al. | 725/135 |
| 7,030,930 B2 * | 4/2006 | Kovacevic | 348/515 |

FOREIGN PATENT DOCUMENTS

| | | |
|---|---|---|
| EP | 0598295 A | 5/1994 |
| EP | 0634870 A | 1/1995 |
| GB | 2103457 | 2/1983 |
| GB | 2195810 A | 4/1988 |

* cited by examiner

AUDIO/VIDEO SYSTEM PROVIDING VARIABLE DELAY

This application claims priority to and all benefits accruing from a provisional application filed in the United States Patent and Trademark Office on Jan. 31, 2002, and there assigned Ser. No. 60/354,056.

BACKGROUND OF THE INVENTION

1. Field of the Invention

The present invention generally relates to audio/video systems, and more particularly, to an audio/video system capable of introducing variable amounts of delay into a signal path so as to properly synchronize audio and video signals.

2. Background Information

Audio/video systems, such as digital television signal receivers, often employ various types of video processing, such as MPEG decoding, that introduce processing delay in a video signal path. In order to synchronize the accompanying audio signal path to the video signal path, the audio signal path must undergo a similar delay. If no such delay is added to the audio signal path, an undesirable synchronization problem occurs in that the audio and video outputs are not synchronized during program viewing. That is, a noticeable "lip sync" problem may occur during program viewing if a proper amount of delay is not added to the audio signal path.

One approach for introducing delay in a signal path involves using a number of serially arranged flip-flops or other delay devices corresponding to the desired delay. This approach, however, is limited in that the delay is typically fixed for a given application. Accordingly, this approach fails to provide a range of different delays. Moreover, such an approach is not necessarily suitable for implementing large delays, especially in consumer electronics applications where additional hardware and the associated costs are strongly avoided.

Different signal processing schemes may introduce different amounts of delay in the video signal path, thus requiring corresponding different amounts of delay in the audio signal path. For example, the delay introduced when decoding a video format on one channel or source may be different from the delay introduced when decoding another video format on another channel or source. Moreover, the difference between the two delays may be large, thus requiring a large range of delays to be added to the audio signal path.

Accordingly, there is a need for a delay implementation technique which avoids the foregoing problems and thereby provides a large delay range without significantly increasing hardware requirements. The present invention addresses these and other problems.

SUMMARY OF THE INVENTION

In accordance with an aspect of the present invention, an audio/video system is disclosed. According to an exemplary embodiment, the audio/video system comprises first means for applying a first delay to a first digital signal. Second means are provided for applying a variable second delay to a second digital signal to time align the second digital signal relative to the first digital signal. The second means includes addressable memory means for selectively storing the second digital signal and for outputting the second digital signal on a first-in, first-out basis to apply the variable second delay to the second digital signal.

In accordance with another aspect of the present invention, a method for synchronizing a first digital signal relative to a second digital signal is disclosed. According to an exemplary embodiment, the method comprises steps of applying a first delay to the first digital signal, and applying a variable second delay to the second digital signal to time align the second digital signal relative to the first digital signal. The variable second delay is applied to the second digital signal by steps comprising selectively storing the second digital signal within an addressable memory, and outputting the second digital signal from the addressable memory on a first-in, first-out basis.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION OF THE PREFERRED EMBODIMENTS

Figure 1:
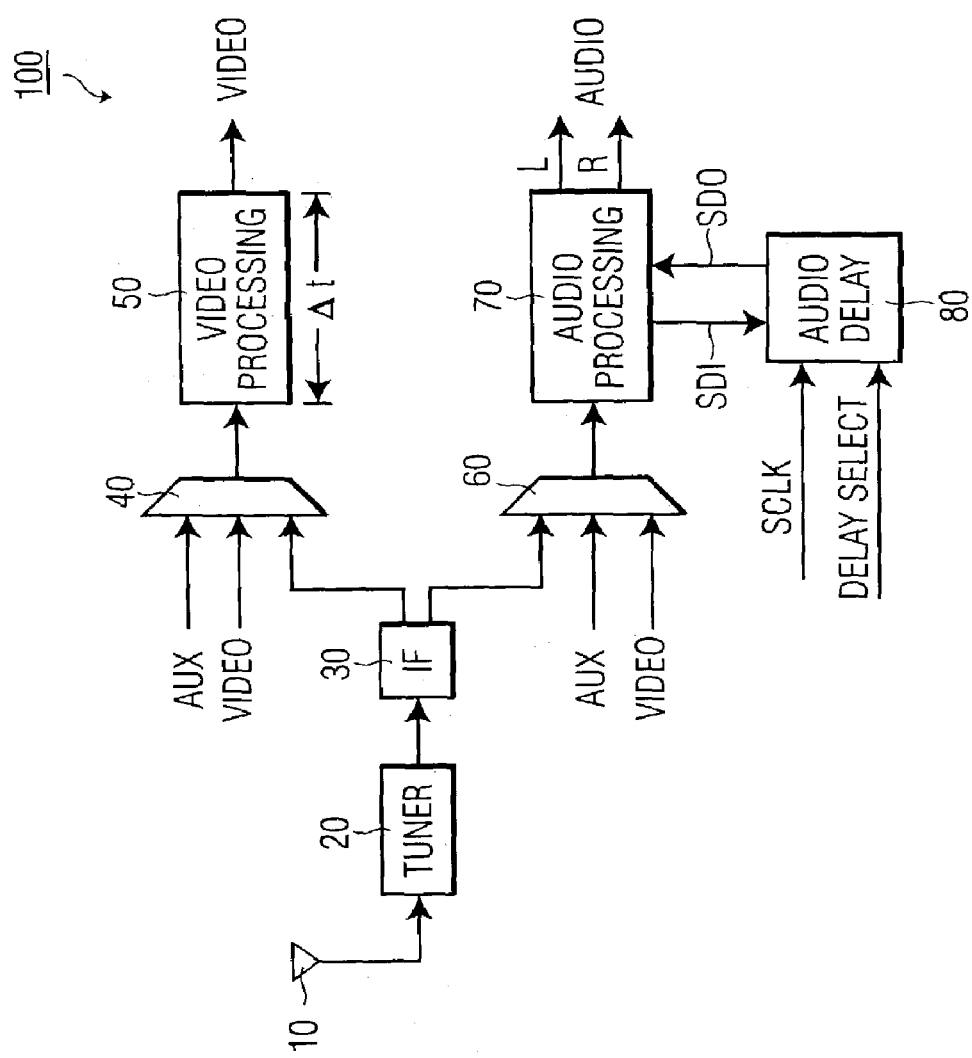
FIG. 1 is a relevant portion of an audio/video system capable of providing variable delay according to the present invention.

Referring now to the drawings, and more particularly to FIG. 1, a relevant portion of an audio/video system 100 capable of providing variable delay according to the present invention is shown. For purposes of example and explanation only, audio/video system 100 of FIG. 1 represents a portion of a television signal receiver. However, as will be explained later herein, the principles of the present invention may also be applied to other types of audio/video systems.

As indicated in FIG. 1, audio/video system 100 comprises a signal input terminal 10, a tuner 20, intermediate frequency (IF) processing circuitry 30, a multiplexer 40, video processing circuitry 50, a multiplexer 60, audio processing circuitry 70, and audio delay circuitry 80. The foregoing elements of audio/video system 100 may for example be embodied as one or more integrated circuits (ICs), and/or other devices.

According to an exemplary mode of operation, signal input terminal 10 receives a radio frequency (RF) input signal from an external signal source. According to an exemplary embodiment, the RF input signal includes audio and video components, and may for example be provided via a terrestrial, cable, satellite or other type of broadcast. Tuner 20 receives the RF input signal from signal input terminal 10 and performs a signal tuning operation thereon to generate an analog output signal having audio and video components.

IF processing circuitry 30 receives the analog output signal from tuner 20 and performs a frequency down conversion thereon to generate frequency converted, analog audio and video signal components. According to an exemplary embodiment, IF processing circuitry 30 generates the video signal components in a frequency band from 0 to 5 MHz, and generates the audio signal components in a frequency band from 0 to 100 kHz. Of course, other frequency bands may be utilized in accordance with the present invention.

Multiplexer 40 receives the video signal components from IF processing circuitry 30, and is also adapted to receive one or more auxiliary video inputs from one or more external sources. . Although not expressly indicated in FIG. 1, multiplexer 40 may be controlled via a switching control signal, provided for example from a processor (not shown), so as to selectively output a particular video signal.

Video processing circuitry 50 receives the analog video signal output from multiplexer 40, and performs one or more video processing functions thereon. According to an exemplary embodiment, video processing circuitry 50 demodulates the analog video signal to a baseband digital video bitstream, and performs one or more digital processing functions, such as MPEG decoding and/or other function(s), on the video bitstream. Following such digital processing function(s), the processed video bitstream is converted back to analog format and output for further processing.

As indicated in FIG. 1, video processing circuitry 50 introduces a processing delay $\Delta T$ into the video signal path by performing the one or more processing functions. In particular, the digital processing functions of video processing circuitry 50 apply a processing delay to the video bitstream, which as will be discussed herein, must be compensated for in the corresponding audio bitstream in order to achieve proper time alignment (i.e., synchronization) between audio and video output signals. Further details regarding the concept of serial data delay will be provided later herein with reference to FIG. 2.

Multiplexer 60 receives the audio signal components from IF processing circuitry 30, and is also adapted to receive one or more auxiliary audio inputs corresponding to the auxiliary video inputs provided to multiplexer 40. Multiplexer 60 may also be controlled via a switching control signal, provided for example from a processor (not shown), so as to selectively output a particular audio signal.

Audio processing circuitry 70 receives the analog audio signal output from multiplexer 60, and performs one or more audio processing functions thereon. According to an exemplary embodiment, audio processing circuitry 70 converts the analog audio signal to a digital audio bitstream conforming to the inter-IC sound (I2S) specification, and performs one or more digital processing functions, such as volume control, treble control, bass control, tone control and/or other function(s), on the audio bitstream. Before or after these digital processing function(s) are performed, however, the audio bitstream is serially input to audio delay circuitry 80 which applies a predetermined delay to the audio bitstream to time align the audio bitstream relative to the corresponding video bitstream processed by video processing circuitry 50. In this manner, synchronization can be achieved between the resultant audio output signals and the corresponding video output signals, thereby avoiding the aforementioned "lip sync" problem during program viewing.

In particular, audio delay circuitry 80 serially receives the audio bitstream (SDI) from audio processing circuitry 70 and applies thereto a predetermined delay to generate an output audio bitstream (SDO), which is a delayed version of the received audio bitstream (SDI). As will be explained later herein with reference to FIG. 3, audio delay circuitry 80 is programmable via a delay select signal and clocked according to a clock signal (SLCK) to apply the predetermined delay to the received audio bitstream (SDI) and thereby generate the delayed output audio bitstream (SDO). As indicated in FIG. 1, the delayed output audio bitstream (SDO) is provided back to audio processing circuitry 70 where it may be processed (if such processing is not performed prior to the delay), and is converted to an analog format and output as left (L) and right (R) channel audio output signals for further processing.

Figure 2:
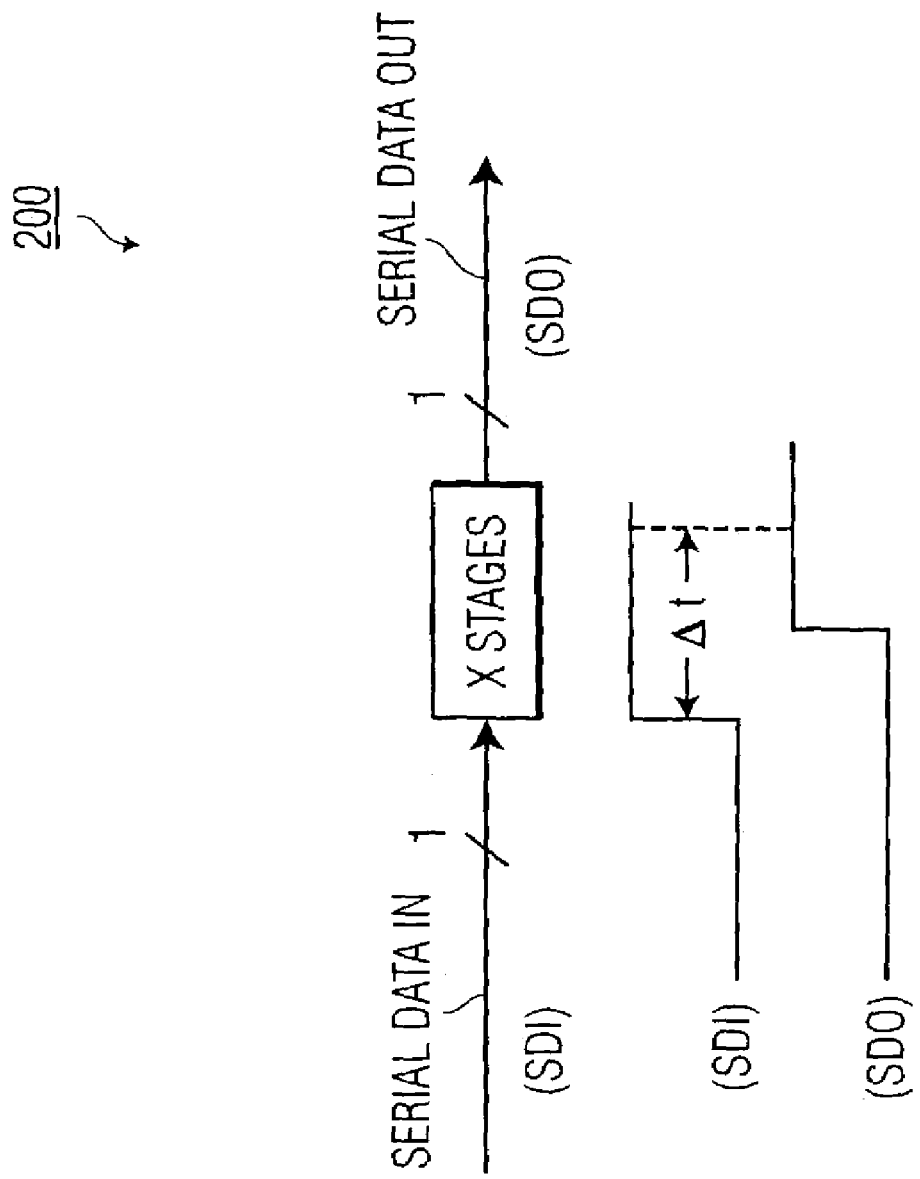
FIG. 2 is a diagram generally illustrating the concept of serial data delay.

Referring to FIG. 2, a diagram 200 generally illustrating the concept of serial data delay is shown. As indicated in FIG. 2, a 1-bit serial data input (Serial Data In (sdi)) undergoes X stages of delay to generate a 1-bit serial data output (Serial Data Out (sdo)), where sdo is the delayed version of sdi. Here, the amount of delay $\Delta t$ is equal to the number of stages of delay divided by the applicable clock frequency. For example, assuming a clock frequency of 1.5 MHz and 56 K stages of delay, the delay $\Delta t$ is equal to 37.3 milliseconds. As will be explained in further detail herein, the present invention utilizes the concept of serial data delay to enable proper time alignment between audio and video output signals.

Figure 3:
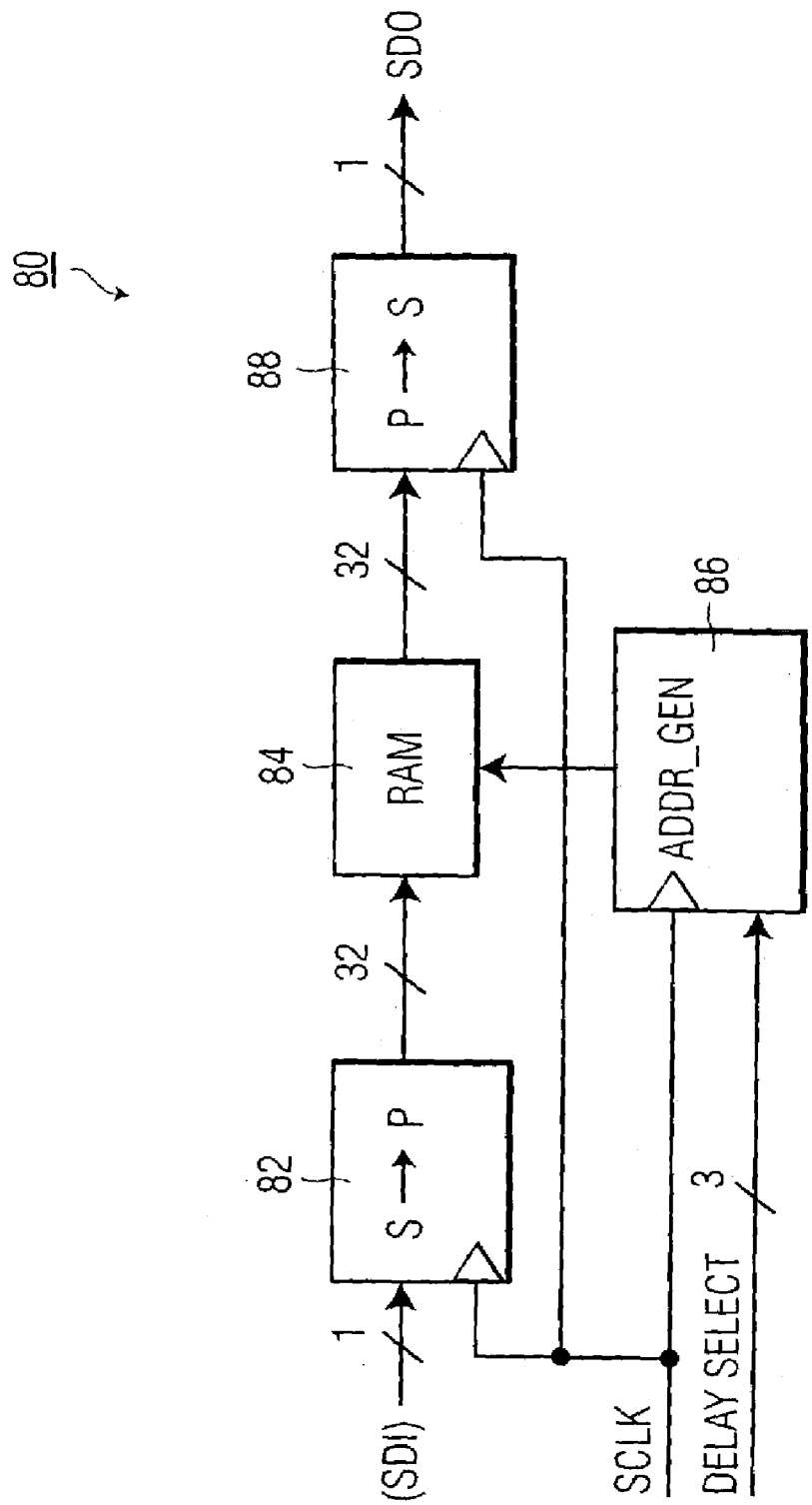
FIG. 3 provides further details of the audio delay circuitry of FIG. 1.

Referring now to FIG. 3, further details of audio delay circuitry 80 of FIG. 1 are shown. As indicated in FIG. 3, audio delay circuitry 80 comprises a serial-to-parallel converter 82, a random access memory (RAM) 84, an address generator 86, and a parallel-to-serial converter 88. The foregoing elements of audio delay circuitry 80 may for example be embodied in one or more ICs.

According to an exemplary mode of operation, serial-to-parallel converter 82 receives the 1-bit serial audio bitstream (SDI) from audio processing circuitry 70 (see FIG. 1), and is clocked according to the clock signal (SCLK) to convert the serial bitstream (SDI) to a 32-bit parallel signal. According to an exemplary embodiment, this 32-bit parallel signal conforms to the I2S audio specification, wherein 16 bits represent left (L) channel audio samples, and the other 16 bits represent right (R) channel audio samples. The principles of the present invention, however, may of course be applied to other audio specifications and/or protocols. Also according to an exemplary embodiment, the clock signal (SCLK) exhibits a frequency of 1.5 MHz, although other frequencies may be utilized. For example, a frequency of 3.07 MHz may be utilized for the clock signal (SLCK).

The 32-bit parallel signal generated by serial-to-parallel converter 82 is written to and read from RAM 84 under the control of address generator 86 to generate a predetermined delay during the write/read operation. Address generator 86 includes an address counter (not shown) which defines the portions of RAM 84 to which data is written to and read from. According to an exemplary embodiment, RAM 84 includes 32 rows and 1760 columns of addressable memory cells, and operates on a first-in, first-out basis under the control of address generator 86.

Address generator 86 is programmed to control the predetermined delay based on the logic state of the delay select signal. According to an exemplary embodiment, the delay select signal is a 3-bit signal generated by a processor (not shown) and provided to address generator 86 via an inter-IC bus. As will be described below, generation of the delay select signal may be controlled in a variety of different ways.

According to an exemplary embodiment, generation of the delay select signal may be controlled based on a user input indicating a desired delay selection. For example, a user may provide an input to audio/video system 100 (e.g., via remote control in response to an on-screen menu) which causes the processor (not shown) to generate the delay select signal in a particular logic state. In this manner, a user may for example selectively increment and/or decrement the delay period until a desired degree of time alignment exists between audio and video output signals during program viewing.

According to another exemplary embodiment, generation of the delay select signal may be controlled based on the audio/video input source. For example, audio/video system 100 may include provision for selection of auxiliary inputs from different audio/video sources (see FIG. 1). Such sources may have differing audio/video timing schemes, thus requiring compensation. Accordingly, audio/video system 100 may utilize a processor (not shown) to generate and control the logic state of the delay select signal based on the selected audio/video input source. For example, a look-up table may be implemented in the processor to set the delay to the most appropriate level based on the selected audio/video input source.

According to yet another exemplary embodiment, generation of the delay select signal may be controlled based on a measured delay. For example, audio/video system 100 may employ circuitry (not shown) which measures a delay between audio and video signals, and provides an output signal to a processor (not shown) representative of the measured delay. The processor may then generate and control the logic state of the delay select signal based on this output signal. In this manner, audio/video system 100 may automatically control the delay independent of any user delay selection or the selected input source. Generation of the delay select signal may also be controlled in ways other than those expressly described herein.

Address generator 86 internally stores the delay select signal, and sets an address counter limit for RAM 84 based on the logic state of the delay select signal to generate a particular delay. That is, address generator 86 selectively defines the portions (i.e., addresses) of RAM 84 to which the 32-bit parallel signal from serial-to-parallel converter 82 is written to and read from based on the logic state of the delay select signal. By defining the portions of RAM 84 to which data is written to and read from, a desired delay is generated during the write/read operation. Table 1 below illustrates possible logic states for the delay select signal (assuming a 3-bit signal), and exemplary amounts of delay corresponding to these logic states.

TABLE 1

| Delay Select Signal | Amount of Delay |
| --- | --- |
| 000 | 4.7 milliseconds |
| 001 | 9.4 milliseconds |
| 010 | 14.1 milliseconds |
| 011 | 18.8 milliseconds |
| 100 | 23.5 milliseconds |
| 101 | 28.2 milliseconds |
| 110 | 32.9 milliseconds |
| 111 | 37.6 milliseconds |

As indicated in Table 1, an exemplary embodiment of the present invention generates delays in 4.7 millisecond steps, with a maximum delay of 37.6 milliseconds. In particular, the maximum delay shown in Table 1 corresponds to just over two video fields of delay. As previously indicated herein, address generator 86 defines the portions of RAM 84 to which data is written to and read from based on the logic state of the delay select signal to generate a particular delay during the write/read operation. Also previously indicated herein, the delay is equal to the number of stages of delay divided by the applicable clock frequency (see discussion of FIG. 2).

According to the exemplary embodiment represented in Table 1, to generate a delay of 4.7 milliseconds, address generator 86 sets the address counter limit for RAM 84 so that data is written to and read from only 220 of the 1760 columns (i.e., $\frac{1}{8}^{th}$) of RAM 84. That is, the number of stages of delay (i.e., 32 rows×220 columns=7,040 stages) divided by the applicable clock frequency (i.e., 1.5 MHz) equals 4.7 milliseconds. Similarly, to generate a delay of 9.4 milliseconds, address generator 86 sets the address counter limit for RAM 84 so that data is written to and read from only 440 of the 1760 columns (i.e., $\frac{1}{4}^{th}$) of RAM 84. That is, the number of stages of delay (i.e., 32 rows×440 columns=14,080 stages) divided by the applicable clock frequency (i.e., 1.5 MHz) equals 9.4 milliseconds. In this manner, the entire RAM 84 (i.e., all 32 rows and 1760 columns) is written to and read from only when the maximum delay of 37.6 milliseconds is generated.

Although Table 1 represents a preferred exemplary embodiment of the present invention, it should be recognized that different amounts of delay than those shown in Table 1 may be generated by adjusting parameters, such as the configuration and/or size of RAM 84, the number of bits representing the delay select signal, and/or the frequency of the clock signal (SCLK).

Parallel-to-serial converter 88 receives the delayed 32-bit parallel signal read from RAM 84, and is clocked according to the clock signal (SCLK) to convert the parallel signal to the 1-bit serial bitstream (SDO) which is output back to audio processing circuitry 70 (see FIG. 1). As previously indicated herein, audio processing circuitry 70 may process (e.g., volume control, treble control, bass control, tone control and/or other function(s)) the audio bitstream prior to the delay applied thereto by audio delay circuitry 80. If so, audio processing circuitry 70 converts the delayed audio bitstream (SDO) to analog format for output as left (L) and right (R) channel audio output signals and further processing.

Alternatively, if the audio bitstream is not digitally processed prior to the delay, audio processing circuitry 70 performs such processing function(s) on the delayed audio bitstream (SDO), and then converts the resultant audio bitstream to analog format for output as left (L) and right (R) channel audio output signals and further processing. In this manner, the left (L) and right (R) channel audio output signals may be properly synchronized with the corresponding video signals output from video processing circuitry 50 (see FIG. 1).

Figure 4:
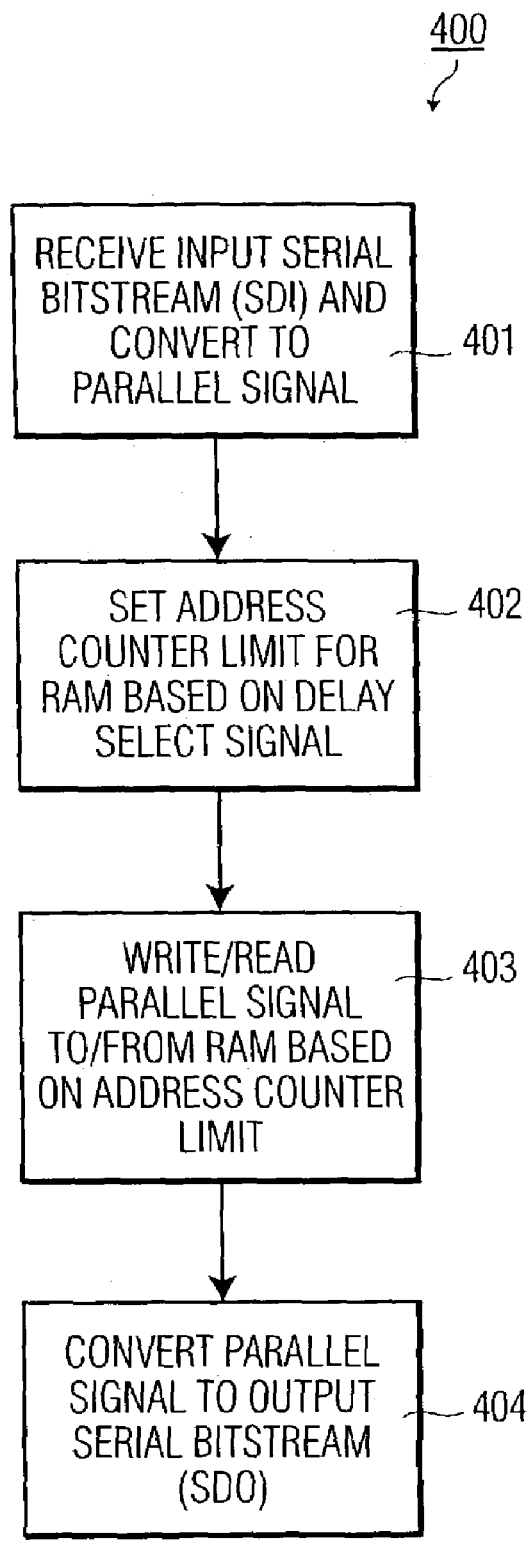
FIG. 4 is a flowchart illustrating exemplary steps for carrying out the present invention.

Referring to FIG. 4, a flowchart 400 illustrating exemplary steps for carrying out the present invention is shown. For purposes of example and explanation, the steps of FIG. 4 will be described with reference to audio delay circuitry 80 of FIGS. 1 and 3. Accordingly, the steps of FIG. 4 are merely exemplary and are not intended to limit the present invention in any manner.

At step 401, serial-to-parallel converter 82 of audio delay circuitry 80 serially receives the 1-bit audio bitstream (SDI) as an input from audio processing circuitry 70, and is clocked according to the clock signal (SLCK) to convert the input serial bitstream (SDI) to a 32-bit parallel signal. At step 402, address generator 86 sets the address counter limit for RAM 84 based on the logic state of the delay select signal. As previously described herein, generation of the delay select signal may be controlled in a variety of different ways. Also previously indicated herein, setting the address counter limit for RAM 84 controls the portions of RAM 84 to which the 32-bit parallel signal is written to and read from. Accordingly, by setting the address counter limit for RAM 84, a desired delay is achieved during the write/read operation.

Next, at step 403, the 32-bit parallel signal is written to and read from RAM 84 based on the address counter limit of address generator 86 to generate the desired delay. For example, to generate a delay of 14.1 milliseconds, address generator 86 sets the address counter limit for RAM 84 so that the 32-bit parallel signal is written to and read from only 660 of the 1760 columns (i.e., $\frac{3}{8}^{th}$) of RAM 84. Similarly, to generate a delay of 37.6 milliseconds, address generator 86 sets the address counter limit for RAM 84 so that the 32-bit parallel signal is written to and read from all 1760 columns of RAM 84. As previously indicated herein, the 32-bit parallel signal is written to and read from RAM 84 on a first-in, first-out basis.

Then, at step 404, parallel-to-serial converter 88 receives the delayed 32-bit parallel signal read from RAM 84, and is clocked according to the clock signal (SCLK) to convert the parallel signal to the 1-bit serial bitstream (SDO), which is output back to audio processing circuitry 70.

As described herein, a predetermined delay is applied to an audio bitstream to time align the audio bitstream relative to the corresponding video bitstream. In this manner, synchronization can be achieved between the resultant audio output signals and the corresponding video output signals, thereby avoiding the aforementioned "lip sync" problem during program viewing. The principles of the present invention are not necessarily limited to this exemplary embodiment, however, and may generally be applied to situations where one signal is time aligned relative to another signal. For example, the present invention may be utilized to introduce a delay in a video signal path to compensate for processing delays in a corresponding audio signal path.

The present invention is particularly applicable to various audio/video systems, either with or without a display device. Accordingly, the phrase "audio/video system" as used herein is intended to encompass various types of systems or apparatuses including, but not limited to, television sets or monitors that include a display device, and systems or apparatuses such as a set-top box, video cassette recorder (VCR), digital versatile disk (DVD) player, video game box, personal video recorder (PVR) or other audio/video system that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An audio/video system (100), comprising:
    first means (50) for determining a value of a first delay to a first digital signal, said first delay being introduced by processing functions associated with said first means; and
    second means (80) for applying a variable second delay to a second digital signal to time align the second digital signal relative to the first digital signal, wherein the second means (80) includes addressable memory means (84) for selectively storing the second digital signal within said memory means based upon said determined value of said first delay of said first digital signal and for outputting the second digital signal on a first-in, first-out basis in response to a delay selection signal to apply the variable second delay to the second digital signal.

2. The audio/video system (100) of claim 1, wherein the first digital signal comprises video data.

3. The audio/video system (100) of claim 1, wherein the second digital signal comprises audio data.

4. The audio/video system (100) of claim 1, wherein the second means (80) further includes dress generation means (86) for controlling the variable second delay by setting an address counter limit for the addressable memory means (84).

5. The audio/video system (100) of claim 1, wherein the variable second delay is controlled based on the delay selection signal, the delay selection signal being user generated.

6. The audio/video system (100) of claim 1, wherein the variable second delay is controlled based on the delay selection signal, the delay selection signal being generated in response to an input source associated with the first and second digital signals.

7. The audio/video system (100) of claim 1, wherein the variable second delay is controlled based on said value of said first delay and a related clock frequency.

8. An audio/video system (100), comprising:
    video circuitry (50) operative to determine a value of a first delay to a digital video signal, said first delay being introduced by processing functions associated with said video circuitry; and
    audio circuitry (80) operative to apply a variable second delay to a digital audio signal to time align the digital audio signal relative to the digital video signal, wherein the audio circuitry (80) includes an addressable memory (84) operative to selectively store the digital audio signal within said memory means based upon said determined value of said first digital signal and output the digital audio signal on a first-in, first-out basis in response to a delay selection signal to apply the variable second delay to the digital audio signal.

9. The audio/video system (100) of claim 8, wherein the audio circuitry (80) further includes an address generator (86) operative to control the variable second delay by setting an address counter limit for the addressable memory (84).

10. The audio/video system (100) of claim 8, wherein the variable second delay is controlled based on the delay selection signal, the delay selection signal being user generated.

11. The audio/video system (100) of claim 8, wherein the variable second delay is controlled based on the delay selection signal, the delay selection signal being generated in response to an input source associated with the digital video signal and the digital audio signal.

12. The audio/video system (100) of claim 8, wherein the variable second delay is controlled based on said value of said first delay and a related clock frequency.

13. A method for synchronizing a second digital signal relative to a first delayed digital signal, comprising steps of:
   determining a value of a first delay of the first delayed digital signal, said first delay being introduced by processing of a first digital signal; and
   applying a variable second delay to the second digital signal to synchronize the second digital signal relative to the first digital signal, wherein the variable second delay is applied to the second digital signal by steps comprising:
   selectively storing the second digital signal within an addressable memory (84) based upon said determined value of said first delay of said first digital signal; and
   outputting the second digital signal from the addressable memory (84) on a first-in, first-out basis in response to a delay selection signal.

14. The method of claim 13, wherein the first digital signal comprises video data.

15. The method of claim 13, wherein the second digital signal comprises audio data.

16. The method of claim 13, further comprising a step of controlling the variable second delay by setting an address counter limit for the addressable memory (84).

17. The method of claim 13, wherein the variable second delay is controlled based on the delay selection signal, the delay selection signal being user generated.

18. The method of claim 13, wherein the variable second delay is controlled based the delay selection signal, the delay selection signal being generated in response to an input source associated with the first and second digital signals.

19. The method of claim 13, wherein said controlling is based on said value of said first delay and a related clock frequency.

* * * * *